(12) United States Patent
Yang et al.

(10) Patent No.: US 11,524,702 B2
(45) Date of Patent: Dec. 13, 2022

(54) METHOD AND DEVICE FOR AUTONOMOUS DRIVING CONTROL, VEHICLE, STORAGE MEDIUM AND ELECTRONIC DEVICE

(71) Applicant: Apollo Intelligent Driving Technology (Beijing) Co., Ltd., Beijing (CN)

(72) Inventors: Fan Yang, Beijing (CN); Junping Wang, Beijing (CN); Bei Liu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 27 days.

(21) Appl. No.: 16/914,582

(22) Filed: Jun. 29, 2020

(65) Prior Publication Data

US 2021/0001890 A1 Jan. 7, 2021

(30) Foreign Application Priority Data

Jul. 1, 2019 (CN) .......................... 201910586826.3

(51) Int. Cl.
*B60W 60/00* (2020.01)

(52) U.S. Cl.
CPC ..... *B60W 60/0025* (2020.02); *B60W 2554/80* (2020.02)

(58) Field of Classification Search
None
See application file for complete search history.

(56) References Cited

U.S. PATENT DOCUMENTS

| 2007/0027581 A1 | 2/2007 | Bauer et al. |
| 2014/0352396 A1* | 12/2014 | Rauh ....................... G01P 21/00 73/1.01 |

(Continued)

FOREIGN PATENT DOCUMENTS

| CN | 108398949 A | 8/2018 |
| CN | 108508881 A | 9/2018 |

(Continued)

OTHER PUBLICATIONS

First Office Action of corresponding Japanese application No. 2020-035770 dated May 11, 2021, three pages.

(Continued)

*Primary Examiner* — James J Lee
*Assistant Examiner* — David Hatch
(74) *Attorney, Agent, or Firm* — Harness, Dickey & Pierce, P.L.C.

(57) ABSTRACT

The present disclosure provides a method and a device for autonomous driving control, a vehicle, a storage medium and an electronic device. The method includes: obtaining first actual position data of a first vehicle body; obtaining relative position data between a second vehicle body and the first vehicle body; determining second actual position data of the second vehicle body according to the first actual position data and the relative position data, so that the vehicle performs autonomous driving control according to the first and second actual position data. The method can obtain the relative position between two vehicle bodies connected in the non-rigid manner and the real-time positions of the two vehicle bodies under different driving conditions in real time during the driving, can accurately depict the dynamic characteristics of two vehicle bodies, so that the vehicle performs autonomous driving control according to the first and second actual position data.

11 Claims, 6 Drawing Sheets

(56) References Cited

U.S. PATENT DOCUMENTS

2019/0235504 A1* 8/2019 Carter ................. G05D 1/0246
2020/0247200 A1* 8/2020 Ferrer .................... H04W 4/48

FOREIGN PATENT DOCUMENTS

| | | | |
|---|---|---|---|
| CN | 109693668 | A | 4/2019 |
| EP | 0548044 | A1 | 6/1993 |
| EP | 3031686 | A1 | 6/2016 |
| JP | 2007523793 | A | 8/2007 |
| JP | 2013041527 | A | 2/2013 |
| WO | 2010132014 | A1 | 11/2010 |
| WO | WO-2017036526 | A1 | 3/2017 |
| WO | 2017215288 | A1 | 12/2017 |
| WO | WO-2019038426 | A1 | 2/2019 |

OTHER PUBLICATIONS

Extended European Search Report for Corresponding Application No. 20167165.8, dated Sep. 21, 2020.
First Office Action of corresponding Chinese patent application No. 201910586826.3 dated Dec. 3, 2021 with English translation, 14 pages.
Yuman, Yuan, et al.: "Modification for Autopilot Diversion of Ship-to-Ship Missile by GPS," China Academic Journal Electronic Publishing House, 1994-2015, pp. 37-44 (English Abtract).
China Notice of Allowance dated Apr. 20, 2022 for CN201910586826.3 with English translation. (6 pages).

* cited by examiner

METHOD AND DEVICE FOR AUTONOMOUS DRIVING CONTROL, VEHICLE, STORAGE MEDIUM AND ELECTRONIC DEVICE

CROSS-REFERENCE TO RELATED APPLICATION

This application claims priority to Chinese Patent Application No. 201910586826.3, filed on Jul. 1, 2019, which is hereby incorporated by reference in its entirety.

TECHNICAL FIELD

The present disclosure relates to the technical field of autonomous driving and, in particular, to a method and a device for autonomous driving control, a vehicle, a storage medium and an electronic device.

BACKGROUND

The autonomous driving vehicle, which is also known as the driverless vehicle, the computer-driven vehicle or the wheeled mobile robot, is a kind of intelligent vehicle that realizes driverless driving through a computer system. With the popularity of autonomous vehicles, autonomous driving vehicles can be used as taxis or public transport vehicles. When passengers use autonomous driving vehicles, they need to input the destination, then the autonomous driving vehicles can generate a driving route based on the current location and the destination, and drive according to the generated driving route.

For an autonomous vehicle having a non-grid connection, as an example, the front carriage and the rear carriage of the towing truck are usually connected by hinges, which is non-rigid connection; as another example, for the large vehicle, a buffer device is set between the upper part and the lower part of the vehicle body for shock absorption, which is also a non-rigid connection.

In autonomous driving of this kind of driverless vehicle with non-rigid connection, a dynamic model of the non-rigid connecting part needs to be depicted in advance. However, such a depiction is static, while the dynamic characteristics of the two rigid bodies connected by the non-rigid connecting part are very inaccurate during the driving of the vehicle.

SUMMARY

The present disclosure provides a method and a device for autonomous driving control, a vehicle, a storage medium and an electronic device, so as to accurately depict the dynamic characteristics of two vehicle bodies connected in the non-rigid manner, and to realize the autonomous driving control.

In the first aspect, the present disclosure provides a method for autonomous driving control, which is applied to a vehicle, the vehicle includes a first vehicle body and a second vehicle body, the first vehicle body and the second vehicle body are connected in a non-rigid manner, the method includes:

obtaining first actual position data of the first vehicle body;

obtaining relative position data between the second vehicle body and the first vehicle body;

determining second actual position data of the second vehicle body according to the first actual position data and the relative position data, so that the vehicle can perform autonomous driving control according to the first actual position data and the second actual position data.

In a possible design, the obtaining relative position data of the second vehicle body relative to the first vehicle body includes:

obtaining first relative position data of the second vehicle body relative to the first vehicle body.

In a possible design, the obtaining relative position data of the second vehicle body relative to the first vehicle body includes:

obtaining second relative position data of the first vehicle body relative to the second vehicle body;

determining whether the first relative position data and the second relative position data are in a corresponding relationship;

if a result of the determining is yes, determining the relative position data as the first relative position data.

In a possible design, if the first relative position data and the second relative position data are not in a corresponding relationship, re-obtaining the first relative position data and the second relative position data.

In a possible design, the obtaining first relative position data of the second vehicle body relative to the first vehicle body includes:

obtaining first relative position sub-data of the second vehicle body relative to the first vehicle body, wherein, the first relative position sub-data is obtained through a first sensor, and the first sensor is set between the first vehicle body and the second vehicle body;

obtaining second relative position sub-data of the second vehicle body relative to the first vehicle body, wherein, the second relative position sub-data is obtained through a second sensor, and the second sensor is set between the first vehicle body and the second vehicle body;

determining whether the first relative position sub-data and the second relative position sub-data are the same;

if a result of the determining is yes, determining the first relative position data as the first relative position sub-data or the second relative position sub-data.

In a possible design, the obtaining second relative position data of the first vehicle body relative to the second vehicle body includes:

obtaining third relative position sub-data of the first vehicle body relative to the second vehicle body, wherein, the third relative position sub-data is obtained through a third sensor, and the third sensor is set between the first vehicle body and the second vehicle body;

obtaining fourth relative position sub-data of the first vehicle body relative to the second vehicle body, wherein, the fourth relative position sub-data is obtained through the fourth sensor, and the fourth sensor is set between the first vehicle body and the second vehicle body;

determining whether the third relative position sub-data and the fourth relative position sub-data are the same;

if a result of the determining is yes, determining the second relative position data as the third relative position sub-data or the fourth relative position sub-data.

In the second aspect, the present disclosure also provides a device for autonomous driving control, which is applied to a vehicle. The vehicle includes a first vehicle body and a second vehicle body. the first vehicle body and the second vehicle body are connected in a non-rigid manner. the device includes:

an obtaining module, used to obtain first actual position data of the first vehicle body;

the obtaining module is also used to obtain relative position data between the second vehicle body and the first vehicle body;

a processing module, used to determine second actual position data of the second vehicle body according to the first actual position data and the relative position data, so that the vehicle performs autonomous driving control according to the first actual position data and the second actual position data.

In a possible design, the obtaining module is specifically used for:

obtaining first relative position data of the second vehicle body relative to the first vehicle body.

In a possible design, the obtaining module is specifically used for:

obtaining second relative position data of the first vehicle body relative to the second vehicle body;

determining whether the first relative position data and the second relative position data are in a corresponding relationship;

if a result of the determining is yes, determining the relative position data as the first relative position data.

In a possible design, the obtaining module is also used to re-obtain the first relative position data and the second relative position data when the first relative position data and the second relative position data are not in a corresponding relationship.

In a possible design, the obtaining module is specifically used for:

obtaining first relative position sub-data of the second vehicle body relative to the first vehicle body, wherein, the first relative position sub-data is obtained through the first sensor, and the first sensor is set between the first vehicle body and the second vehicle body;

obtaining second relative position sub-data of the second vehicle body relative to the first vehicle body, wherein, the second relative position sub-data is obtained through the second sensor, and the second sensor is set between the first vehicle body and the second vehicle body;

determining whether the first relative position sub-data and the second relative position sub-data are the same;

if a result of the determining is yes, determining the first relative position data as the first relative position sub-data or the second relative position sub-data.

In a possible design, the obtaining module is specifically used for:

obtaining third relative position sub-data of the first vehicle body relative to the second vehicle body, where, the third relative position sub-data is obtained through the third sensor, which is set between the first vehicle body and the second vehicle body;

obtaining fourth relative position sub-data of the first vehicle body relative to the second vehicle body, where, the fourth relative position sub-data is obtained through the fourth sensor, and the fourth sensor is set between the first vehicle body and the second vehicle body;

determining whether the third relative position sub-data and the fourth relative position sub-data are the same;

if a result of the determining is yes, determining the second relative position data as the third relative position sub-data or the fourth relative position sub-data.

In the third aspect, the present disclosure also provides a computer-readable storage medium on which a computer program is stored. When this program is executed by the processor, it can realize any one of the possible methods for autonomous driving control in the first aspect.

In the fourth aspect, the present disclosure also provides an electronic device, including:

a processor; and, a memory, used to store instructions to be executed by the processor;

where, the processor is configured to implement the method for autonomous driving control according to any one of the possible methods for autonomous driving control in the first aspect through executing the instructions.

The method and the device for autonomous driving control, the vehicle, the storage medium and the electronic device provided by the present disclosure, by means of obtaining the first actual position data of the first vehicle body and the relative position data between the second vehicle body and the first vehicle body, and determining the second actual position data of the second vehicle body according to the first actual position data and the relative position data to obtain the relative position between two vehicle bodies connected in the non-rigid manner and the real-time positions of the two vehicle bodies under different driving conditions in real time, can accurately depict the dynamic characteristics of two vehicle bodies, so that the vehicle can perform autonomous driving control according to the first actual position data and the second actual position data.

BRIEF DESCRIPTION OF DRAWINGS

In order to explain the embodiments of the present disclosure more clearly, the following will make a brief introduction to the drawings in the embodiments of the present disclosure. It is obvious that the described embodiments are merely a part of embodiments of the present disclosure, but not all of them. A person of ordinary skill in the art, without paying creative labor, may obtain other embodiments on the basis of the embodiments described in the present disclosure.

DESCRIPTION OF EMBODIMENTS

In order to make the objectives, technical solutions, and advantages of the embodiments of the present disclosure clearer, in the following, the technical solutions in the embodiments of the present disclosure will be clearly and completely described with reference to the drawings in the embodiments of the present disclosure. Obviously, the described embodiments are merely a part of embodiments of the present disclosure, but not all of them. All other embodiments obtained by a person of ordinary skill in the art without creative efforts on the basis of the described embodiments shall fall within the protection scope of the present disclosure.

Figure 1:
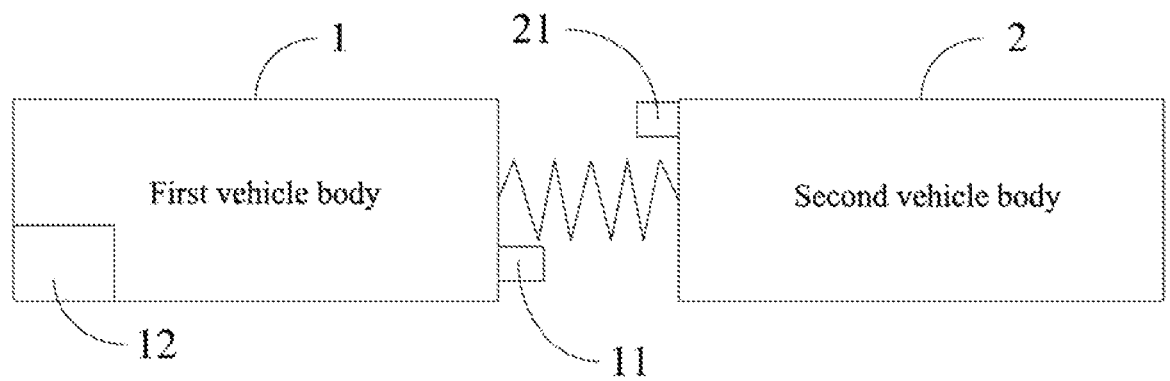
FIG. 1 is an application scenario diagram of a method for autonomous driving control according to an exemplary embodiment.
Figure 2:
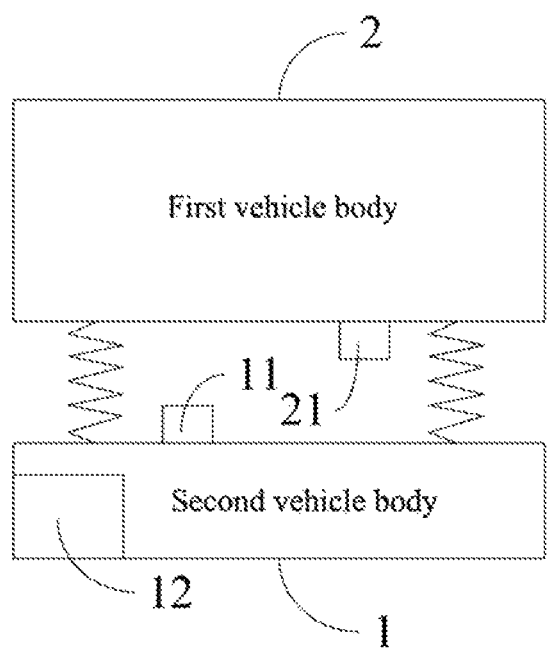
FIG. 2 is an application scenario diagram of a method for autonomous driving control according to another exemplary embodiment.

FIG. 1 is an application scenario diagram of a method for autonomous driving control according to an exemplary embodiment, and FIG. 2 is an application scenario diagram of a method for autonomous driving control according to another exemplary embodiment. As shown in FIG. 1-FIG. 2, the method for autonomous driving control provided in this embodiment is applied to a vehicle, where the vehicle includes a first vehicle body 1 and a second vehicle body 2, and where the first vehicle body 1 and the second vehicle body 2 are connected in the non-rigid manner. As shown in FIG. 1, the first vehicle body 1 and the second vehicle body 2 are two carriages of the vehicle respectively, and the first vehicle body 1 and the second vehicle body 2 are connected in the non-rigid manner, for example, they are connected through hinges. As shown in FIG. 2, the first vehicle body 1 and the second vehicle body 2 are the upper half and the lower half of the vehicle body respectively, where, the first vehicle body 1 and the second vehicle body 2 are connected in the non-rigid manner, for example, they are connected through a buffer device.

A first sensor 11 is also set on the first vehicle body 1, where, the first sensor 11 is used to obtain the relative position data of the second vehicle body 2 relative to the first vehicle body 1. It is worth noting that in this embodiment, the first sensor 11 may be a camera, a radar, a laser sensor, etc., or a combination of multiple sensors. In this embodiment, the specific form of the first sensor is not limited, it is only necessary to ensure that the first sensor can obtain the relative position data of the second vehicle body relative to the first vehicle body.

Further, in a possible design, in order to realize redundant mutual detection, a second sensor 21 may also be set on the second vehicle body 2, where, the second sensor 21 is used to obtain the relative position data of the first vehicle body 1 relative to the second vehicle body 2. It is worth noting that in this embodiment, the second sensor 21 may be a camera, a radar, a laser sensor, etc., or a combination of multiple sensors. In this embodiment, the specific form of the second sensor is not limited, it is only necessary to ensure that the second sensor can obtain the relative position data of the first vehicle body relative to the second vehicle body.

In addition, an autonomous driving control module 12 is also set on the first vehicle body 1, where, the first sensor 11 and the second sensor 21 are respectively connected with the autonomous driving control module 12. Where, obtaining the first actual position data of the first vehicle body 1 is a basic capability in the technology for realizing autonomous driving by a vehicle, which is not described in this embodiment, and may refer to the method for obtaining car body position data to realize the autonomous driving by a car. Specifically, for the autonomous driving car, since the car itself has only one rigid body, it is only necessary to obtain the gesture position data of the car itself. Then, the gesture position data is input into the autonomous driving system, and then, by combining with the environmental data obtained through other environmental sensing sensors on the vehicle, the autonomous driving control is realized.

Figure 3:
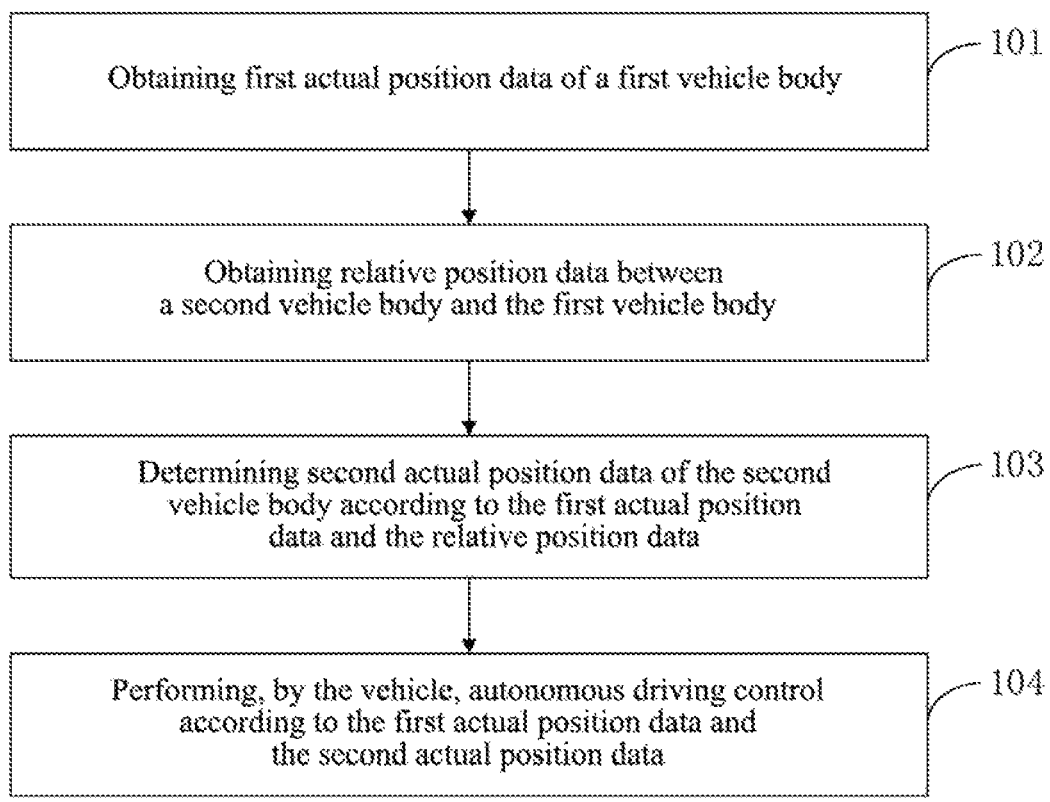
FIG. 3 is a flowchart of a method for autonomous driving control according to an exemplary embodiment.

FIG. 3 is a flowchart of a method for autonomous driving control according to an exemplary embodiment. As shown in FIG. 3, the method for autonomous driving control provided in the embodiment includes:

Step 101: obtaining first actual position data of a first vehicle body.

Specifically, obtaining the actual position data of a rigid carriage is the basic capability in the technology for realizing autonomous driving by the vehicle, which will not be described in this embodiment and may refer to the method for obtaining car body position data to realize the autonomous driving by a car.

Step 102: obtaining relative position data between a second vehicle body and the first vehicle body.

Specifically, the relative position data between the second vehicle body and the first vehicle body may be obtained by a sensor set between the second vehicle body and the first vehicle body. It needs to be understood that the relative position data between the second vehicle body and the first vehicle body may be the relative position of the second vehicle body relative to the first vehicle body by taking the first vehicle body as a basis, and may also be the relative position data of the first vehicle body relative to the second vehicle body by taking the second vehicle body as a basis.

When the relative position data between the second car body and the first car body is the relative position of the second vehicle body relative to the first vehicle body by taking the first vehicle body as a basis, it may be obtained through the sensor set on the first car body. In a possible design, the sensor set on the first car body may be a camera, where, the camera may be set in the form of dual cameras. Since dual cameras can be used to measure the distance, the position of each feature point of the second vehicle body relative to the cameras can be obtained through the image of the second vehicle body obtained by the cameras, and then the relative position data between the second vehicle body and the first vehicle body can be obtained. In a possible design, the sensor set on the first vehicle body may also be a module composed of at least three laser ranging sensors, where, at least three laser ranging sensors are not in a straight line, and then the relative position data with the first vehicle body is measured by a plurality of laser ranging sensors. It is worth noting that in this embodiment, the above possible implementation is only an example to better explain the principle of this embodiment, and the specific form of the sensor is not limited in this embodiment, it is only necessary to ensure that the sensor can obtain the relative position data of the second vehicle body relative to the first vehicle body.

Figure 4:
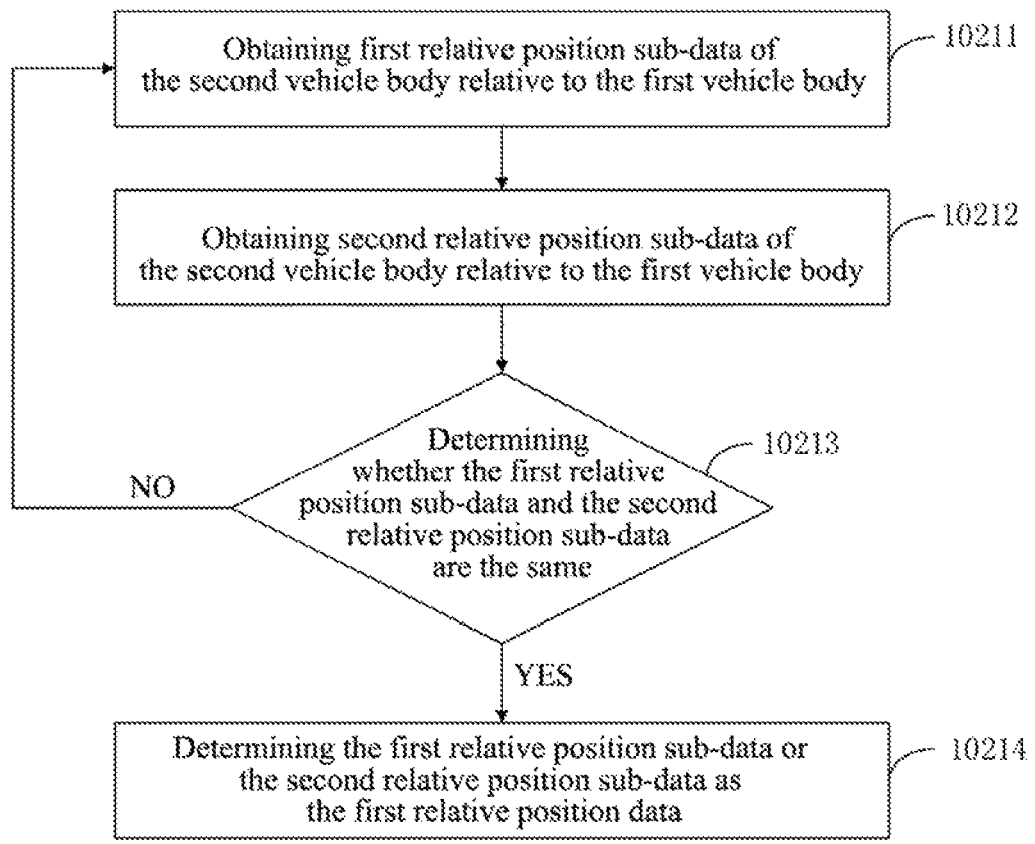
FIG. 4 is a possible flow chart of step 102 in the embodiment shown in FIG. 3.

Because of the high safety requirements for the autonomous driving vehicle, in order to further improve the accuracy of the relative position data between the second body and the first body, so as to ensure that the obtained relative position data will not deviate due to the performance change of a certain sensor itself, the data obtained by the two sensors may be compared and then be considered as reliable when the two are the same or the errors are within a preset range. FIG. 4 is a possible flowchart of step 102 in the embodiment shown in FIG. 3. As shown in FIG. 4, in this embodiment, step 102 includes:

Step 10211: obtaining first relative position sub-data of the second vehicle body relative to the first vehicle body.

Specifically, obtain the first relative position sub-data of the second vehicle body relative to the first vehicle body, where, the first relative position sub-data is obtained through the first sensor, and the first sensor is set between the first vehicle body and the second vehicle body.

Step 10212: obtaining second relative position sub-data of the second vehicle body relative to the first vehicle body.

Specifically, obtain the second relative position sub-data of the second vehicle body relative to the first vehicle body, where, the second relative position sub-data is obtained through the second sensor, and the second sensor is set between the first vehicle body and the second vehicle body.

Step 10213: determining whether the first relative position sub-data and the second relative position sub-data are the same. If the result of the determining is yes, then step 10214 will be executed; if the result of the determining is not, then step 10211 will be executed.

Step 10214: determining the first relative position sub-data or the second relative position sub-data as the first relative position data.

When the relative position data of the second vehicle body relative to the first vehicle body is the relative position data of the first vehicle body relative to the second vehicle body by taking the second vehicle body as a basis, it may be obtained through the sensor set on the second vehicle body. In a possible design, the sensor set on the second car body may be a camera, where, the camera may be set in the form of dual cameras. Since the dual cameras can be used to measure the distance, the position of each feature point of the first vehicle body relative to the cameras can be obtained through the image of the first vehicle body obtained by the cameras, and then the relative position data between the first vehicle body and the second vehicle body can be obtained. In a possible design, the sensor set on the second vehicle body may also be a module composed of at least three laser ranging sensors, where, at least three laser ranging sensors are not in a straight line, and then the relative position data with the second vehicle body is measured by a plurality of laser ranging sensors. It is worth noting that in this embodiment, the above possible implementation is only an example to better explain the principle of this embodiment, and the specific form of the sensor is not limited in this embodiment, it is only necessary to ensure that the sensor can obtain the relative position data of the first vehicle body relative to the second vehicle body.

Figure 5:
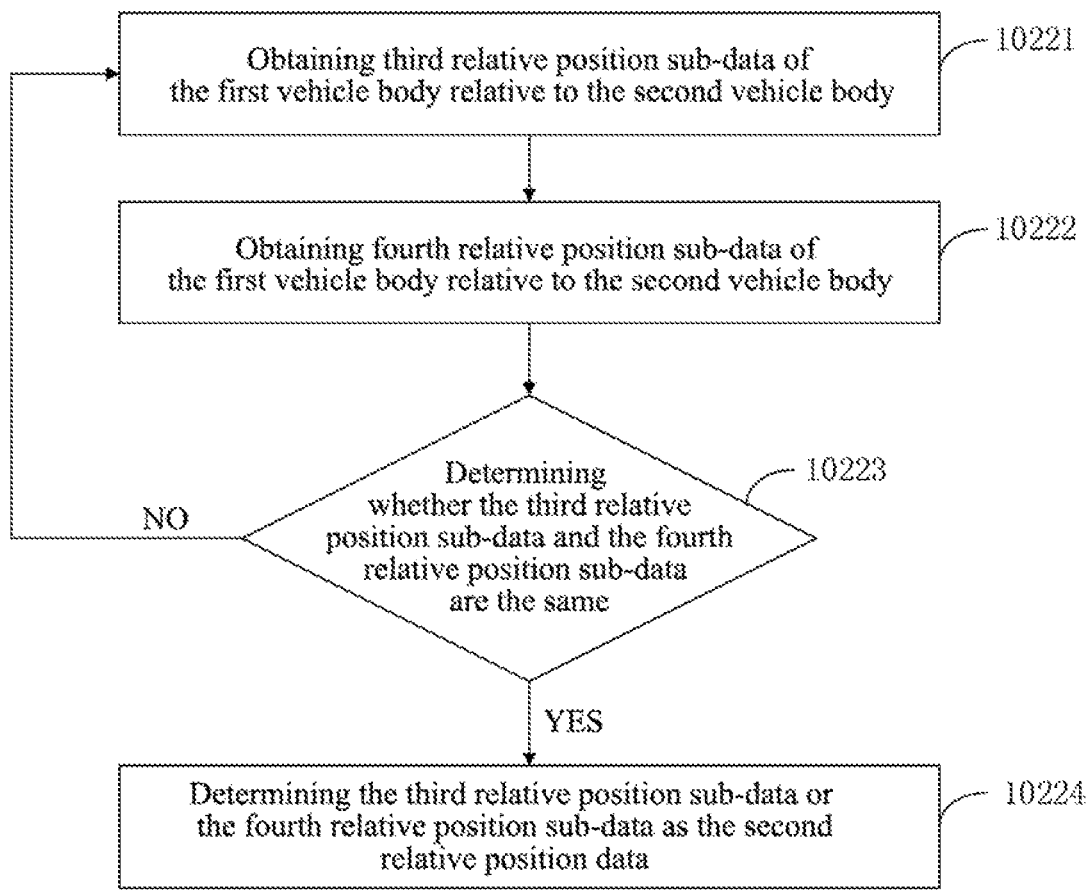
FIG. 5 is another possible flow chart of step 102 in the embodiment shown in FIG. 3.

Because of the high safety requirements for the autonomous driving vehicle, in order to further improve the accuracy of the relative position data between the second body and the first body, so as to ensure that the obtained relative position data will not deviate due to the performance change of a certain sensor itself, the data obtained by the two sensors can be compared and then be considered as reliable when the two are the same or the error is within the preset range. FIG. 5 is another possible flowchart of step 102 in the embodiment shown in FIG. 3. As shown in FIG. 5, in this embodiment, step 102 includes:

Step 10221: obtaining third relative position sub-data of the first vehicle body relative to the second vehicle body.

Specifically, obtain the third relative position sub-data of the first vehicle body relative to the second vehicle body, wherein, the third relative position sub-data is obtained through the third sensor, and the third sensor is set between the first vehicle body and the second vehicle body.

Step 10222: obtaining fourth relative position sub-data of the first vehicle body relative to the second vehicle body.

Specifically, obtain the fourth relative position sub-data of the first vehicle body relative to the second vehicle body, where, the fourth relative position sub-data is obtained through the fourth sensor, and the fourth sensor is set between the first vehicle body and the second vehicle body.

Step 10223: determining whether the third relative position sub-data and the fourth relative position sub-data are the same. If the result of the determining is yes, then step 10224 will be executed; if the result of the determining is not, then step 10221 will be executed.

Step 10224: determining the third relative position sub-data or the fourth relative position sub-data as the second relative position data.

In addition, in order to further improve the accuracy of the relative position data between the second car body and the first car body and ensure that the obtained relative position data will not deviate due to the change of the performance of a sensor itself, two groups of data can be obtained at the same time for comparison. When the two are the same or the error is within the preset range, the obtained data is considered as reliable. Where, the two groups of data are: the relative position data of the second vehicle body relative to the first vehicle body by taking the first vehicle body as a basis, and the relative position data of the first vehicle body relative to the second vehicle body by taking the second vehicle body as a basis.

Specifically, the first relative position data of the second vehicle body relative to the first vehicle body may be obtained first, and the second relative position data of the first vehicle body relative to the second vehicle body may be obtained. Then, determine whether the first relative position data and the second relative position data are in a corresponding relationship. If the result of the determining is yes, determine the first relative position data as the relative position data, and if the first relative position data and the second relative position data are not in a corresponding relationship, then re-obtain the first relative position data and the second relative position data until the two are consistent, or after the number of consecutive inconsistencies exceeds a certain threshold, in order to avoid the occurrence of danger, the autonomous driving mode shall be terminated and the manual driving intervention shall be prompted.

Step 103: determining second actual position data of the second vehicle body according to the first actual position data and the relative position data.

Specifically, after obtaining the first actual position data of the first vehicle body and the relative position data between the second vehicle body and the first vehicle body, the second actual position data of the second vehicle body is determined according to the first actual position data and the relative position data.

In a possible design, when the sensor is a camera, the current position of the camera can be determined by the first actual position data of the first car body and the preset position of the camera on the first car body. Then, the position of the camera can be used as the origin to establish a coordinate system, and the position of each feature point on the second vehicle body in the coordinate system can be determined according to the position of each feature point on the second vehicle body relative to the camera, and then determine the second actual position data of the second vehicle body.

Step 104: performing, by the vehicle, autonomous driving control according to the first actual position data and the second actual position data.

After determining the first actual position data and the second actual position data, the first actual position data and the second actual position data are input to the autonomous driving control module located in the first vehicle body, so that the autonomous driving control module can make driving strategy judgment based on the first actual position data and the second actual position data, where, it is worth noting that the algorithms for performing autonomous driving according to the gesture position data of the vehicle and other environmental data are known in the art, which will not be described in detail in this embodiment.

In this embodiment, by means of obtaining the first actual position data of the first vehicle body and the relative position data between the second vehicle body and the first vehicle body, and then determining the second actual position data of the second vehicle body according to the first actual position data and the relative position data to obtain the relative position between two vehicle bodies connected in the non-rigid manner and the real-time positions of the two vehicle bodies under different driving conditions in real time during the driving, the dynamic characteristics of the two bodies can be accurately depicted, and thus the vehicle can perform autonomous driving control based on the first actual position data and the second actual position data.

Figure 6:
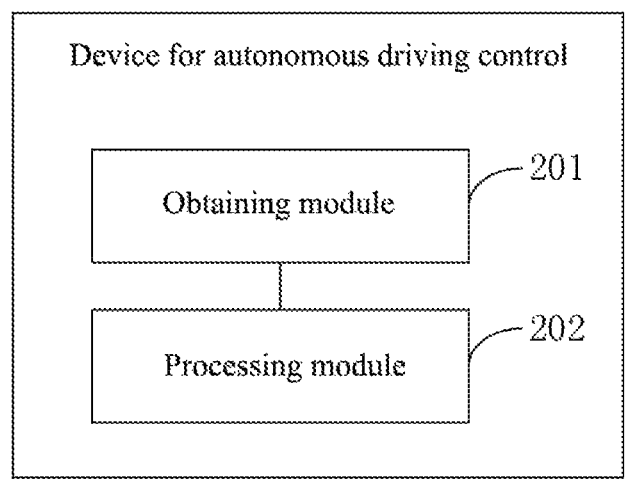
FIG. 6 is a structural diagram of a device for autonomous driving control according to an exemplary embodiment.

FIG. 6 is a structural diagram of a device for autonomous driving control according to an exemplary embodiment. As shown in FIG. 6, the device for autonomous driving control provided in this embodiment is applied to a vehicle, the vehicle includes a first vehicle body and a second vehicle body, the first vehicle body and the second vehicle body are connected in a non-rigid manner, and the device includes:

an obtaining module 201, used to obtain first actual position data of the first vehicle body;

the obtaining module 201 is also used to obtain relative position data between the second vehicle body and the first vehicle body;

a processing module 202, used to determine second actual position data of the second vehicle body according to the first actual position data and the relative position data, so that the vehicle performs autonomous driving control according to the first actual position data and the second actual position data.

In a possible design, the obtaining module 201 is specifically used to:

obtain the first relative position data of the second vehicle body relative to the first vehicle body.

In a possible design, the obtaining module 201 is specifically used to:

obtain second relative position data of the first vehicle body relative to the second vehicle body;

determine whether the first relative position data and the second relative position data are in a corresponding relationship;

If a result of the determining is yes, the relative position data is the first relative position data.

In a possible design, the obtaining module 201 is also used to re-obtain the first relative position data and the second relative position data if the first relative position data and the second relative position data are not in a corresponding relationship.

In a possible design, the obtaining module 201 is specifically used to:

obtain first relative position sub-data of the second vehicle body relative to the first vehicle body, where, the first relative position sub-data is obtained through the first sensor, and the first sensor is set between the first vehicle body and the second vehicle body;

obtain second relative position sub-data of the second vehicle body relative to the first vehicle body, where, the second relative position sub-data is obtained through the second sensor, and the second sensor is set between the first vehicle body and the second vehicle body;

determining whether the first relative position sub-data is the same as the second relative position sub-data;

if a result of the determining is yes, the first relative position data is the first relative position sub-data or the second relative position sub-data.

In a possible design, the obtaining module 201 is specifically used to:

obtain third relative position sub-data of the first vehicle body relative to the second vehicle body, where, the third relative position sub-data is obtained through a third sensor, and the third sensor is set between the first vehicle body and the second vehicle body;

obtaining fourth relative position sub-data of the first vehicle body relative to the second vehicle body, where, the fourth relative position sub-data is obtained through a fourth sensor, and the fourth sensor is set between the first vehicle body and the second vehicle body;

determining whether the third relative position sub-data and the fourth relative position sub-data are the same;

if a result of the determining is yes, the second relative position data is the third relative position sub-data or the fourth relative position sub-data.

The above processing module 201 may be configured as one or more integrated circuits for implementing the above methods, such as one or more Application Specific Integrated Circuit (shorted as ASIC), one or more digital signal processor (shorted as DSP), or one or more Field Programmable Gate Array (shorted as FPGA). For example, when one of the above modules is implemented through scheduling program codes by a processing component, the processing component may be a general-purpose processor, such as Central Processing Unit (shorted as CPU) or other processors that can schedule program codes. For example, these modules can be integrated and implemented in the form of system-on-a-chip (shorted as SOC).

In addition, each functional unit in each embodiment of the present disclosure may be integrated into one processing unit, or each unit may exist separately physically, or two or more units may be integrated into one unit. The above integrated units can be implemented in the form of hardware, or in the form of hardware plus software functional units.

It is worth noting that the device for autonomous driving control in the embodiment shown in FIG. 6, can be used to perform the above methods in the embodiments shown in FIG. 3-FIG. 5, where the specific implementation manners and the technical effects are as similar as that of the methods and will not be described here.

On the other hand, the present disclosure provides a vehicle, including the device for autonomous driving control as described in FIG. 6.

The present disclosure also provides a computer-readable storage medium, stored with a computer program is stored, where the technical solutions corresponding to any method embodiments described above when the computer program is executed, where the implementation principle and technical effects are as similar as that of the methods, and will not be described here.

Figure 7:
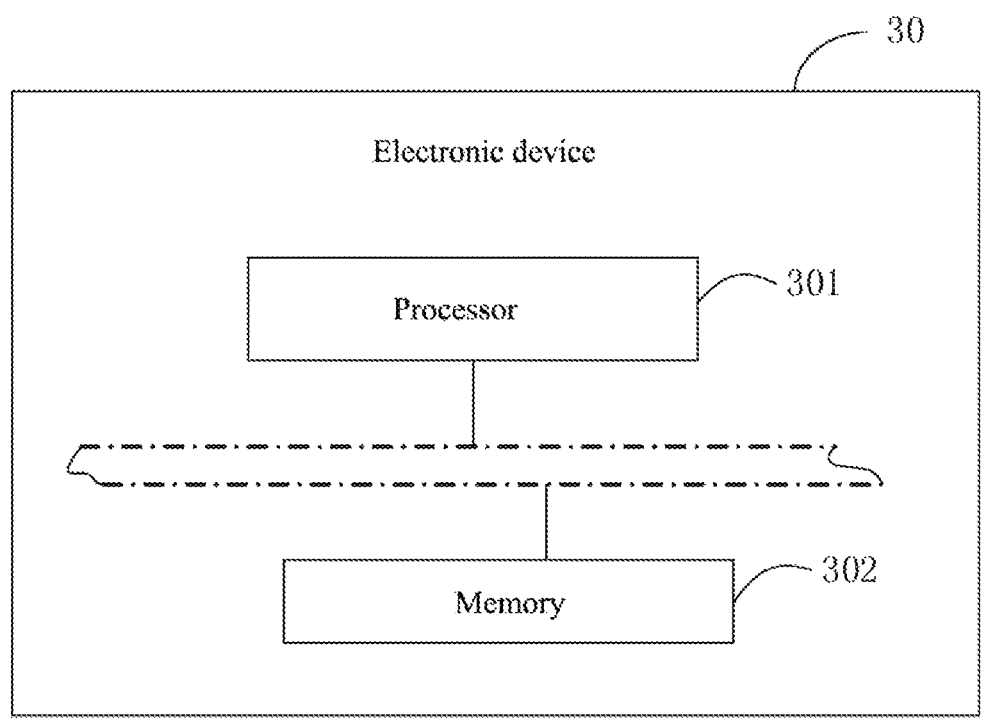
FIG. 7 is a structural diagram of an electronic device according to an exemplary embodiment.

FIG. 7 is a structural diagram of an electronic device according to an exemplary embodiment. As shown in FIG. 7, the electronic device 30 provided in the embodiment includes:

a processor 301;

a memory 302, used to store a computer program of the processor;

where, the processor 301 is configured to implement the method for autonomous driving control provided by any of the embodiments of the method by executing the computer program.

Where, the processor 301 is configured to execute any method embodiments described above through executing the computer program, where the implementation principle and technical effects are as similar as that of the methods, and will not be described here.

Finally, it should be noted that the above embodiments are only used to explain the technical solutions of the present disclosure, not to limit it; although the present disclosure has been described in detail with reference to the above embodiments, those skilled in the art should understand that the technical solution recorded in the above embodiments can still be modified, or some or all of the technical features can be replaced equally; and these modifications or replacements do not make the essence of the corresponding technical solutions outside the scope of the technical solutions of the embodiments of the present disclosure.

What is claimed is:

1. A method for autonomous driving control, wherein, the method is applied to a vehicle, the vehicle comprises a first vehicle body and a second vehicle body, the first vehicle body and the second vehicle body are connected in a non-rigid manner, the method is implemented by a processor of a device for autonomous driving control and comprises:
    obtaining first actual position data of the first vehicle body;
    obtaining relative position data between the second vehicle body and the first vehicle body;
    determining second actual position data of the second vehicle body according to the first actual position data and the relative position data; and
    performing autonomous driving control according to the first actual position data and the second actual position data;
    wherein the obtaining relative position data between the second vehicle body and the first vehicle body comprises:
    obtaining first relative position data of the second vehicle body relative to the first vehicle body;
    obtaining second relative position data of the first vehicle body relative to the second vehicle body;
    determining whether the first relative position data and the second relative position data are in a corresponding relationship, wherein the first relative position data and the second relative position data being in the corresponding relationship comprises: the first relative position data and the second relative position data being the same, or, a difference between the first relative position data and the second relative position data is within a preset range; and
    if a result of the determining is yes, determining the first relative position data as the relative position data;
    if the first relative position data and the second relative position data are not in a corresponding relationship, re-obtaining the first relative position data and the second relative position data.

2. The method for autonomous driving control according to claim 1, wherein, the obtaining the first relative position data of the second vehicle body relative to the first vehicle body comprises:
    obtaining first relative position sub-data of the second vehicle body relative to the first vehicle body, wherein, the first relative position sub-data is obtained through a first sensor, and the first sensor is set between the first vehicle body and the second vehicle body;
    obtaining second relative position sub-data of the second vehicle body relative to the first vehicle body, wherein, the second relative position sub-data is obtained through a second sensor, and the second sensor is set between the first vehicle body and the second vehicle body;
    determining whether the first relative position sub-data and the second relative position sub-data are the same;
    if a result of the determining is yes, determining the first relative position sub-data or the second relative position sub-data as the first relative position data.

3. The method for autonomous driving control according to claim 1, wherein, the obtaining the second relative position data of the first vehicle body relative to the second vehicle body comprises:
    obtaining third relative position sub-data of the first vehicle body relative to the second vehicle body, wherein, the third relative position sub-data is obtained through a third sensor, and the third sensor is set between the first vehicle body and the second vehicle body;
    obtaining fourth relative position sub-data of the first vehicle body relative to the second vehicle body, wherein, the fourth relative position sub-data is obtained through the fourth sensor, and the fourth sensor is set between the first vehicle body and the second vehicle body;
    determining whether the third relative position sub-data and the fourth relative position sub-data are the same;
    if a result of the determining is yes, determining the third relative position sub-data or the fourth relative position sub-data as the second relative position data.

4. A device for autonomous driving control, wherein, the device is applied to a vehicle, the vehicle comprises a first vehicle body and a second vehicle body, the first vehicle body and the second vehicle body are connected in a non-rigid manner, the device comprises at least one processor and a non-volatile memory stored with instructions, and the instructions are executed by the at least one processor to enable the at least one processor to:
    obtain first actual position data of the first vehicle body;
    obtain relative position data between the second vehicle body and the first vehicle body;
    determine second actual position data of the second vehicle body according to the first actual position data and the relative position data; and
    performing autonomous driving control according to the first actual position data and the second actual position data;
    wherein the at least one processor is further enabled to:
    obtain first relative position data of the second vehicle body relative to the first vehicle body;
    obtain second relative position data of the first vehicle body relative to the second vehicle body;
    determine whether the first relative position data and the second relative position data are in a corresponding relationship, wherein the first relative position data and the second relative position data being in the corresponding relationship comprises: the first relative position data and the second relative position data being the same, or, a difference between the first relative position data and the second relative position data is within a preset range; and
    if a result of the determining is yes, determine the first relative position data as the relative position data;
    if the first relative position data and the second relative position data are not in a corresponding relationship, re-obtaining the first relative position data and the second relative position data.

5. The device for autonomous driving control according to claim 4, wherein the at least one processor is further enabled to:

obtain first relative position sub-data of the second vehicle body relative to the first vehicle body, wherein, the first relative position sub-data is obtained through a first sensor, and the first sensor is set between the first vehicle body and the second vehicle body;

obtain second relative position sub-data of the second vehicle body relative to the first vehicle body, wherein, the second relative position sub-data is obtained through a second sensor, and the second sensor is set between the first vehicle body and the second vehicle body;

determine whether the first relative position sub-data and the second relative position sub-data are the same;

if a result of the determining is yes, determine the first relative position sub-data or the second relative position sub-data as the first relative position data.

6. The device for autonomous driving control according to claim 4, wherein the at least one processor is further enabled to:

obtain third relative position sub-data of the first vehicle body relative to the second vehicle body, wherein, the third relative position sub-data is obtained through a third sensor, and the third sensor is set between the first vehicle body and the second vehicle body;

obtain fourth relative position sub-data of the first vehicle body relative to the second vehicle body, wherein, the fourth relative position sub-data is obtained through the fourth sensor, and the fourth sensor is set between the first vehicle body and the second vehicle body;

determine whether the third relative position sub-data and the fourth relative position sub-data are the same;

if a result of the determining is yes, determine the third relative position sub-data or the fourth relative position sub-data as the second relative position data.

7. A non-transitory computer-readable storage medium, stored with a computer program, wherein, the method for autonomous driving control according to claim 1 is implemented when the program is executed.

8. An electronic device, comprising:

a processor; and, a memory, used to store instructions to be executed by the processor;

wherein, the processor is configured to implement the following steps through executing the instructions:

obtaining first actual position data of the first vehicle body;

obtaining relative position data between the second vehicle body and the first vehicle body;

determining second actual position data of the second vehicle body according to the first actual position data and the relative position data; and performing autonomous driving control according to the first actual position data and the second actual position data;

obtaining first relative position data of the second vehicle body relative to the first vehicle body;

obtaining second relative position data of the first vehicle body relative to the second vehicle body;

determining whether the first relative position data and the second relative position data are in a corresponding relationship, wherein the first relative position data and the second relative position data being in the corresponding relationship comprises: the first relative position data and the second relative position data being the same, or, a difference between the first relative position data and the second relative position data is within a preset range; and if a result of the determining is yes, determining the first relative position data as the relative position data;

if the first relative position data and the second relative position data are not in a corresponding relationship, re-obtaining the first relative position data and the second relative position data.

9. The electronic device according to claim 8, wherein, the obtaining the first relative position data of the second vehicle body relative to the first vehicle body comprises:

obtaining first relative position sub-data of the second vehicle body relative to the first vehicle body, wherein, the first relative position sub-data is obtained through a first sensor, and the first sensor is set between the first vehicle body and the second vehicle body;

obtaining second relative position sub-data of the second vehicle body relative to the first vehicle body, wherein, the second relative position sub-data is obtained through a second sensor, and the second sensor is set between the first vehicle body and the second vehicle body;

determining whether the first relative position sub-data and the second relative position sub-data are the same;

if a result of the determining is yes, determining the first relative position sub-data or the second relative position sub-data as the first relative position data.

10. The electronic device according to claim 8, wherein, the obtaining the second relative position data of the first vehicle body relative to the second vehicle body comprises:

obtaining third relative position sub-data of the first vehicle body relative to the second vehicle body, wherein, the third relative position sub-data is obtained through a third sensor, and the third sensor is set between the first vehicle body and the second vehicle body;

obtaining fourth relative position sub-data of the first vehicle body relative to the second vehicle body, wherein, the fourth relative position sub-data is obtained through the fourth sensor, and the fourth sensor is set between the first vehicle body and the second vehicle body;

determining whether the third relative position sub-data and the fourth relative position sub-data are the same;

if a result of the determining is yes, determining the third relative position sub-data or the fourth relative position sub-data as the second relative position data.

11. A vehicle, comprising: the electronic device according to claim 8.

* * * * *